US008598455B2

(12) United States Patent
Heien et al.

(10) Patent No.: US 8,598,455 B2
(45) Date of Patent: Dec. 3, 2013

(54) PROTECTION ASSEMBLIES FOR TERMINAL DEVICES

(75) Inventors: Stephen G. Heien, Seal Beach, CA (US); Jimmy M. Chang, Rancho Palos Verdes, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 779 days.

(21) Appl. No.: 12/702,359

(22) Filed: Feb. 9, 2010

(65) Prior Publication Data

US 2011/0114354 A1     May 19, 2011

Related U.S. Application Data

(60) Provisional application No. 61/261,990, filed on Nov. 17, 2009.

(51) Int. Cl.
| | |
|---|---|
| *H01R 13/46* | (2006.01) |
| *H01B 7/00* | (2006.01) |
| *G06F 1/16* | (2006.01) |
| *G06F 1/20* | (2006.01) |
| *H05K 5/00* | (2006.01) |
| *H05K 7/00* | (2006.01) |
| *H05K 7/20* | (2006.01) |

(52) U.S. Cl.
USPC ... 174/60; 174/135; 361/679.02; 361/679.03; 361/724

(58) Field of Classification Search
USPC .......... 174/138 F, 93, 60, 135; 439/863, 864, 439/460, 763, 859, 866, 865, 867, 868; 248/65; 385/135; 403/196; 24/270, 24/20 EE, 16 BB, 301, 42; 361/679.02, 361/679.03, 724

See application file for complete search history.

(56) References Cited

U.S. PATENT DOCUMENTS

| | | | | |
|---|---|---|---|---|
| 4,367,572 | A | * | 1/1983 | Zielenski ........................ 24/301 |
| 5,147,217 | A | | 9/1992 | Neale, III et al. |
| 5,497,036 | A | | 3/1996 | Zemlicka |
| 5,576,516 | A | | 11/1996 | Kameyama et al. |
| 6,108,202 | A | | 8/2000 | Sumida |
| 6,218,620 | B1 | * | 4/2001 | Michel ............................ 174/92 |
| 6,700,782 | B1 | * | 3/2004 | Bopp et al. ..................... 361/704 |
| 7,239,789 | B2 | * | 7/2007 | Grubish et al. ............... 385/135 |
| 7,688,580 | B2 | * | 3/2010 | Richardson et al. ..... 361/679.56 |

(Continued)

FOREIGN PATENT DOCUMENTS

| | | |
|---|---|---|
| CN | 201174434 Y | 12/2008 |
| EP | 0621671 A1 | 10/1994 |

(Continued)

OTHER PUBLICATIONS

Chinese Patent and Trademark Office. Chinese Office Action dated Oct. 16, 2012 for Patent Application No. 201010550057.0.

*Primary Examiner* — Hoa C Nguyen
*Assistant Examiner* — Binh Tran
(74) *Attorney, Agent, or Firm* — Ingrassia Fisher & Lorenz, P.C.

(57) ABSTRACT

Methods and assemblies are provided for protecting a terminal of a conductor assembly with an open face and a closed face. The protection assembly includes a housing configured to at least partially cover the open face; and a strap coupled to the housing and configured to extend around the closed face such that the housing is detachably secured to the terminal device.

11 Claims, 3 Drawing Sheets

(56) References Cited

U.S. PATENT DOCUMENTS

2004/0245258 A1* 12/2004 Connors et al. ............... 220/713
2006/0213940 A1* 9/2006 Chen et al. ................... 224/269
2006/0279924 A1* 12/2006 Richardson et al. .......... 361/683
2007/0271970 A1* 11/2007 Marsilio et al. ................ 70/57.1

FOREIGN PATENT DOCUMENTS

| JP | 2006324065 A | 11/2006 |
|---|---|---|
| JP | 2008077839 A | 4/2008 |
| JP | 4218203 B2 | 2/2009 |

* cited by examiner

US 8,598,455 B2

PROTECTION ASSEMBLIES FOR TERMINAL DEVICES

CROSS REFERENCE TO RELATED APPLICATION

This application claims the benefit of U.S. Provisional Application No. 61/261,990, filed Nov. 17, 2009.

TECHNICAL FIELD

The present invention generally relates to protection assemblies for electrical components, and more particularly relates to protection assemblies for terminal devices for conductor assemblies of electrical components.

BACKGROUND

Electrical components, such as those used in hybrid or electric vehicles, may be manufactured separately and later assembled into a final product or system. Each electrical component may be associated with a conductor assembly that functions to couple together the various electrical components of the final product. In particular, these conductor assemblies may have a terminal device that houses the terminals necessary for the subsequent electrical couplings during assembly. Conventionally, prior to assembly, these terminal devices may expose the terminals to environmental and manufacturing contaminants, particularly during shipment of the electrical components or during an end-of-line wash. Protection assemblies for terminal devices have been proposed to prevent contamination of the terminal devices. However, conventional attempts at protection assemblies may be subject to a number of issues, including insufficient protection, insufficient securement to the terminal device, not being water-tight, and/or requiring special tools to install or remove.

Accordingly, it is desirable to provide improved protection assemblies for electrical components, particularly terminal devices of electrical components. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a protection assembly is provided for a terminal device of a conductor assembly having an open face and a closed face. The protection assembly includes a housing configured to at least partially cover the open face; and a strap coupled to the housing and configured to extend around the closed face such that the housing is detachably secured to the terminal device.

In accordance with an exemplary embodiment, a method is provided for protecting a terminal device having an open face and a closed face with a protection assembly having a housing and a strap coupled to the housing. The method includes at least partially covering the open face of the terminal device with the housing of the protection assembly; and wrapping the strap of the protection assembly around the closed face of the terminal device to detachably secure the protection assembly to the terminal device.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Broadly, exemplary embodiments described herein provide a protection assembly configured to be coupled to a terminal device in a manner that protects the terminal device from contaminants, particularly during shipment. The protection assembly may have a housing that, when installed, covers an open face of the terminal device. A strap coupled to the housing extends around the terminal device and is secured to the other side of the housing to detachably couple the terminal device and protection assembly. The strap may have a protective cup that covers a hole in the terminal device when installed. Additionally, the interior of the housing may have an alignment structure that receives a bolt extending through the terminal device.

Figure 1:
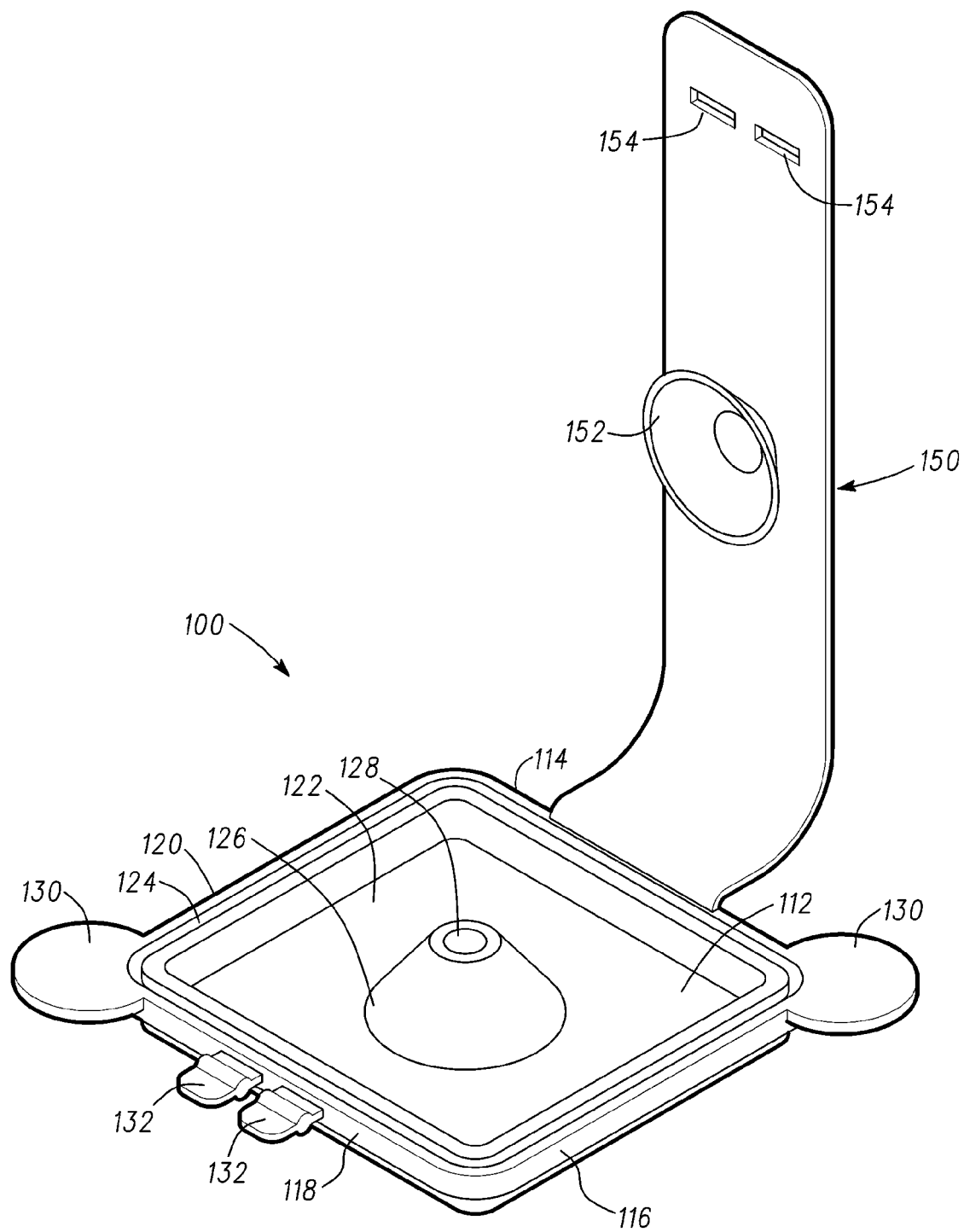
FIG. 1 is an isometric view of a protection assembly in an open, uninstalled state in accordance with an exemplary embodiment.

Now turning to the drawings, FIG. 1 is an isometric view of a protection assembly 100 in an open, uninstalled state in accordance with an exemplary embodiment. As will be discussed in greater detail below, the protection assembly 100 is suitable for use with electrical components such as a terminal device for a conductor assembly.

In this exemplary embodiment, the protection assembly 100 includes a housing 110 that is generally sized and shaped to mate with the terminal device, as discussed below. The housing 110 may include a base 112 and a number of side walls 114, 116, 118, 120 that define a cavity 122. The side walls 114, 116, 118, 120 may further define a groove 124 that extends around the perimeter or circumference on the outer edges of the side walls 114, 116, 118, 120.

The housing 110 further includes an alignment structure 126 arranged on the base 112. The alignment structure 126, in this exemplary embodiment, is conical with a hole 128 extending through the center thereof.

One or more handling tabs 130 may extend from one or more of the side walls 114, 116, 118, 120. In the depicted exemplary embodiment, the handling tabs 130 are arranged on opposing diagonal corners, e.g., a first handling tab 130 extends from the corner between side walls 114, 116 and a second handling tab 130 extends from the corner between side walls 118, 120. One or more installation tabs 132 may also extend from the side walls 114, 116, 118, 120. In the depicted exemplary embodiment, two installation tabs 132 are arranged on side wall 118, as discussed in greater detail below.

The protection assembly 100 further includes an installation strap 150. One end of the strap 150 extends from one side wall of the housing 110. In this exemplary embodiment, the strap 150 extends from side wall 114. The other end of the strap 150 is unattached during the depicted, uninstalled state.

On one side of the strap 150, a cup 152 is arranged that may additionally cover openings or holes in the terminal devices, as discussed below. The strap 150 further defines one or more installation slots 154 adjacent to the remote end of the strap 150 that mate with the installation tabs 132 of the housing 110 when the protection assembly 100 is installed on the terminal device.

As shown, the strap 150 and housing 110 may be integral with one another. In particular, all of the components of the protection assembly 100 may be formed from a single material piece. In general, the protection assembly 100 may be formed from an elastic material, such as rubber or other elastomers. In other embodiments, the protection assembly 100 may be formed from other materials and include one or more discrete components. Further features and functions of the protection assembly 100 will be discussed in greater detail below after a brief discussion of the terminal device.

Figure 2:
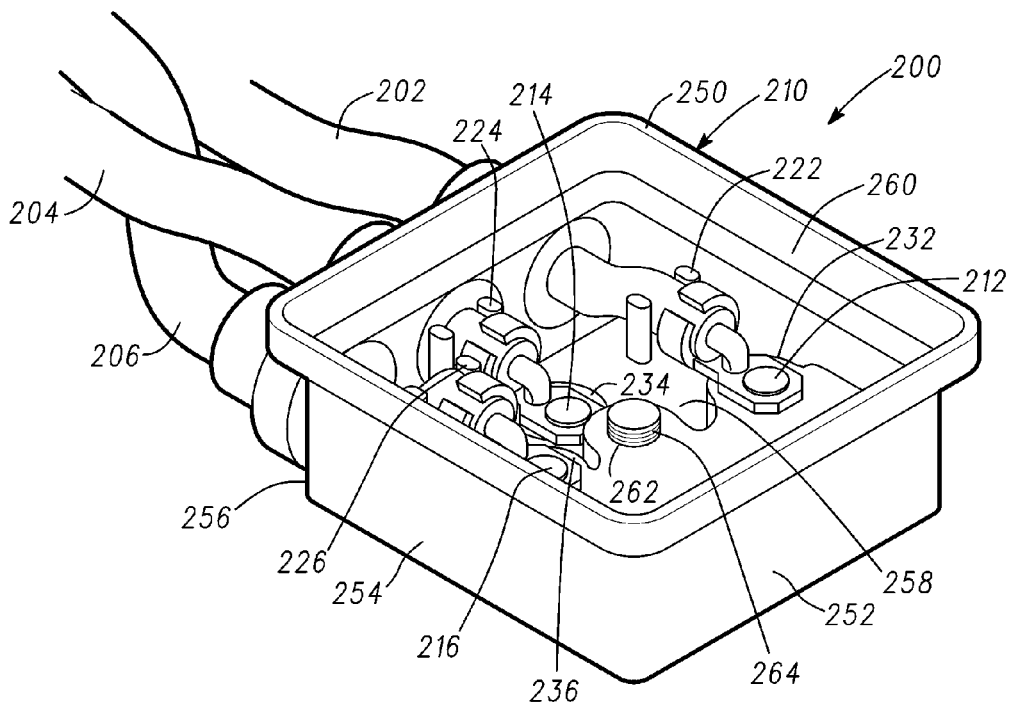
FIG. 2 is a view of an open face of a terminal device of a conductor assembly suitable for use with the protection assembly of FIG. 1 in accordance with an exemplary embodiment.

FIG. 2 is a view of a conductor assembly 200 suitable for use with the protection assembly 100 of FIG. 1 in accordance with an exemplary embodiment. The conductor assembly 200 generally includes one or more cables 202, 204, 206. One end of the conductor assembly 200 terminates with a terminal device 210. The other end may be directly coupled to an electrical component (not shown) or may have another terminal device (not shown). In one exemplary embodiment, the conductor assembly 200 may be connectors for electrical equipment, such as those in hybrid, electric, or extended range vehicles, and may particularly be used for coupling a transmission to a traction power inverter module, as well as other high voltage uses. As such, in the depicted embodiment, the terminal device 210 may be configured to be coupled to an inverter module (not shown) while the other end (not shown) is coupled to a transmission.

The terminal device 210 generally houses and secures terminals 212, 214, 216 associated with the cables 202, 204, 206. For example, the terminal device 210 may include clips 222, 224, 226 and backings 232, 234, 236 that suitably position the terminals 212, 214, 216 such that appropriate electrical connections are made when the terminal device 210 couples the two electrical components.

As shown, the terminal device 210 is formed by one or more sides 250, 252, 254, 256. The terminal device 210 is further defined by a closed face 258 and an open face 260, which are more clearly illustrated in subsequent views such as FIG. 5. The closed face 258 defines a hole 262 that receives a bolt 264 that assists coupling of the terminal device 210 to the electrical component (not shown) during subsequent assembly.

FIG. 2 is a view showing the open face 260, and as shown, the open face 260 generally exposes the terminals 212, 214, 216 to the environment. As will now be described, the protection assembly 100 (FIGS. 1, 3-6) at least partially covers the open face 260 to protect the otherwise exposed terminals 212, 214, 216 from contamination.

Figure 3:
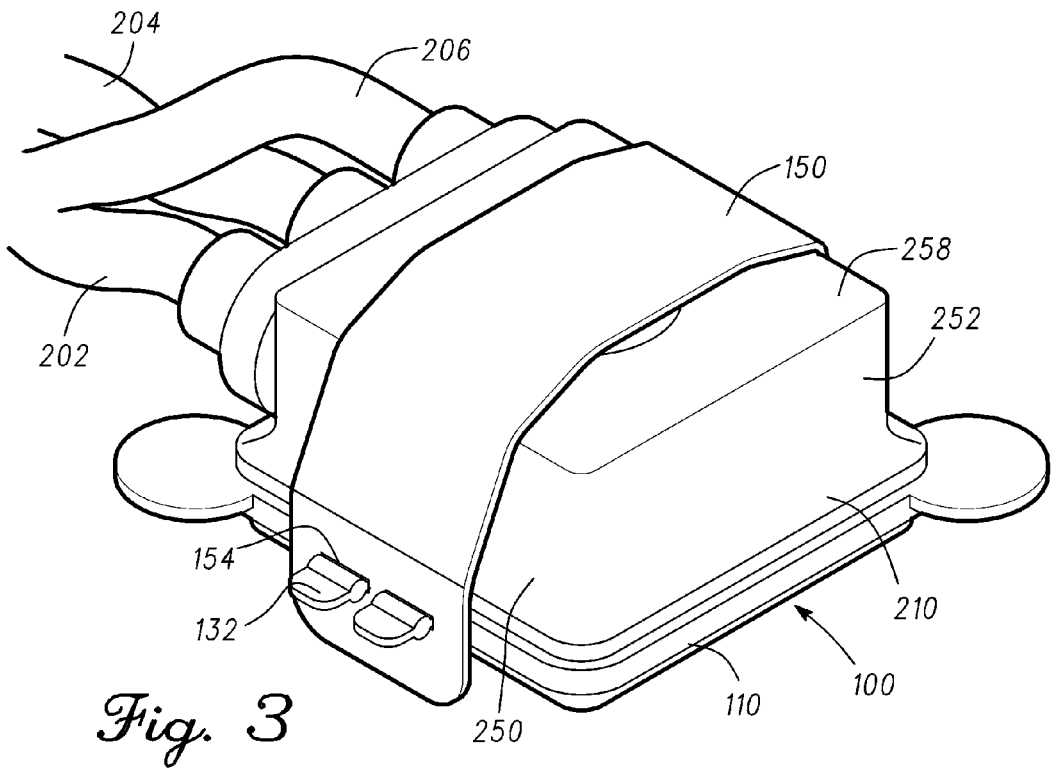
FIG. 3 is an isometric view of the protection assembly of FIG. 1 installed on the terminal device of FIG. 2 in accordance with an exemplary embodiment.
Figure 4:
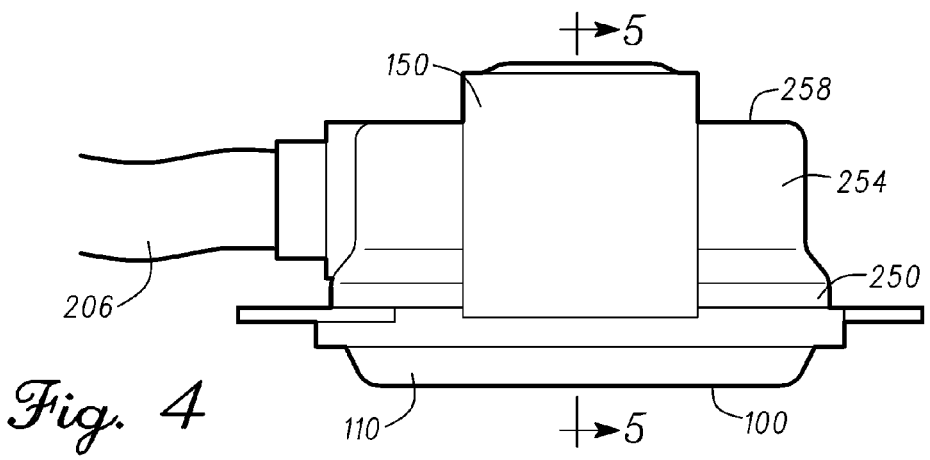
FIG. 4 is a side view of the protection assembly of FIG. 1 installed on the terminal device of FIG. 2 in accordance with an exemplary embodiment.
Figure 5:
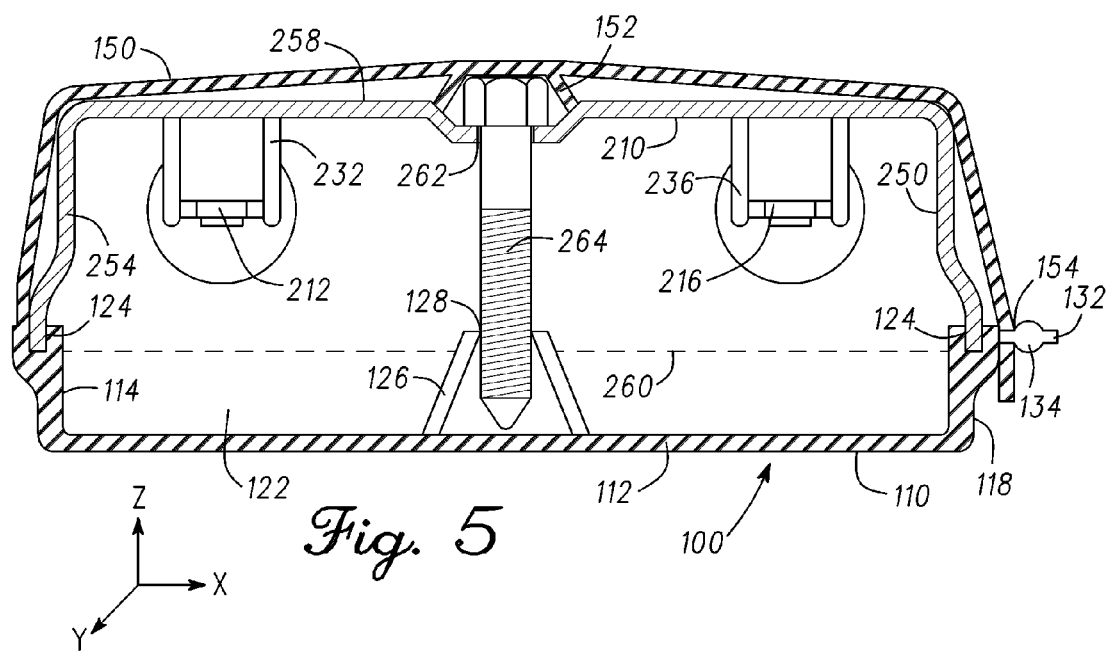
FIG. 5 is a cross-sectional view of the protection assembly and terminal device through line 5-5 of FIG. 4 in accordance with an exemplary embodiment.

FIGS. 3 and 4 are isometric and side views, respectively, of the protection assembly 100 installed on the terminal device 210, and FIG. 5 is a cross-sectional view of the protection assembly 100 and terminal device 210 through line 5-5 of FIG. 4. FIGS. 3-5 will be collectively discussed below.

During installation, the housing 110 of the protection assembly 100 at least partially covers the open face 260 of the terminal device 210. In particular, the base 112 and side walls 114, 116, 118, 120 of the housing 110 cover the open face 260. As best shown for example in FIG. 5, the side walls 250, 252, 254, 256 of the terminal device 210 are positioned in the groove 124 formed in the side walls 112, 114, 116, 118 of the housing 110. In one exemplary embodiment, the side walls 250, 252, 254, 256 of the terminal device 210 form a generally water-tight seal with the side walls 112, 114, 116, 118 of the housing 110. In the depicted embodiment, the housing 110 is sized and shaped as a rectangle to approximately match the size and shape of the terminal device 210. In other embodiments, the size and shape of the housing 110 may be modified to match other terminal devices, including hexagonal and irregular terminal devices.

Securing the terminal device 210 within the groove 124 may also function to retain the terminal device 210 relative to the protection assembly 100 in an xy-plane or lateral direction. In one exemplary embodiment, the groove 124 has a thickness that is slightly smaller than the thickness of the side walls 250, 252, 254, 256 retained by the groove 124. This configuration enables a close fit and ensures sealing effectiveness. Although the depicted embodiment illustrates the groove 124 within the housing 110, in a further embodiment, the protection device 100 may not have such a groove. As an alternative, the terminal device 210 may have a groove into which the side walls 112, 114, 116, 118 are arranged.

Additionally, when the terminal device 210 is mated with the housing 110, the bolt 264 is positioned within the hole 128 of the aligning structure 126. This arrangement more accurately aligns the terminal device 210 relative to the protection assembly 100 and may also at least partially retain the terminal device 210 relative to the protection assembly 100 in the xy-plane. In addition to, or as an alternative to, the aligning structure 126, other features of the housing 110 may be provided within the cavity 122 to accommodate or protect components within the terminal device 210, as necessary or desired.

After positioning the housing 110, the strap 150 is wrapped around closed face 258 of the terminal device 210 and secured to the other side 118 of the housing 110. As noted above, the strap 150 extends from the side wall 124. As such, when the strap 150 is wrapped around the closed face 258, the installation tabs 132 on the opposite side wall 118 are positioned to extend through the slots 154 and secure the strap 150. The installation tabs 132 may have one or more protrusions 134 to retain the strap 150 on the installation tabs 132.

In general, the strap 150 is flexible such that the strap 150 can be securely wrapped around the terminal device 210. The strap 150 can be sized to generally correspond to the lengths of the side 250, closed face 258, and side 254 of the terminal device 210. In one exemplary embodiment, the strap 150 has elastic properties and is slightly shorter than the combined lengths of the side 250, closed face 258, and side 254 of the terminal device 210. As such, the strap 150 is stretched around the terminal device 210 to create preloaded tension to more securely compress the terminal device 210 onto the protection assembly 100, particularly in a z-direction.

In further embodiments, the strap 150 is not elastic but may be appropriately sized to sufficiently secure the terminal device 210 and protection assembly 100. In other embodiments, the strap 150 may have additional slots 154 to accommodate terminal devices 210 of different sizes. Moreover, other connection mechanisms may be provided as an alternative to the slots 154 and tabs 132. For example, the strap 150 may be coupled to the housing 110 via buckles, snaps, Velcro, and other mechanical fasteners based on, for example, robustness and ease of use. Moreover, additional straps may be provided for further securing the protection assembly 100 to the terminal device 210.

When the strap 150 is wrapped around the closed face 258, the cup 152 on the underside of the strap 150 covers the bolt 264 and hole 262 in the closed face 258. The cup 152 is sized and shaped to completely cover the bolt 264 and hole 262. The cup 154 generally creates a water-tight seal with the closed face 258 to prevent contaminants entering the terminal device 210 through the hole 262.

Figure 6:
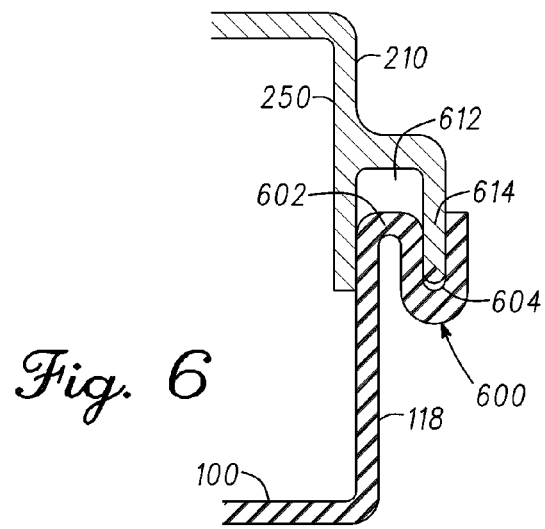
FIG. 6 is a partial cross-sectional view of a protection assembly and terminal device in accordance with an alternate exemplary embodiment.

FIG. 6 is a partial cross-sectional view of a protection assembly 100 and terminal device 210 in accordance with an alternate exemplary embodiment. In particular, FIG. 6 illustrates an alternate sealing arrangement between the protection assembly 100 and terminal device 210. Unless otherwise noted, the protection assembly 100 and terminal device 210 of FIG. 6 are similar to those discussed above in FIGS. 1-5.

In this exemplary embodiment, the protection assembly 100 has side walls (e.g., side wall 118) that define a double tongue-and-groove sealing structure 600. In the depicted embodiment, the sealing structure 600 is S-shaped with a protrusion 602 and a groove 604. The protrusion 602 is received by a corresponding groove 612 in the side wall of the terminal device 210, and the groove 604 receives a corresponding protrusion 614. This arrangement may provide an improved seal between the protection assembly 100 and the terminal device 210.

Accordingly, the protection assembly 100 may be secured to the terminal device 210 in a simple manner and without tools. When installed, the protection assembly 100 protects the terminals 212, 214, 216 from contamination, including water, during shipping, transport, and/or prior to final assembly. The protection assembly 100 may also protect the terminals 212, 214, 216 of the terminal device 210 against water intrusion during high-pressure wash at the end of the transmission assembly process. Prior to assembling the terminal device 210 into a final product or system, the protection assembly 100 may be removed by slipping the strap 150 off the tabs 132, unwrapping the strap 150 from the terminal device 210, and removing the housing 110 from the open face 260 of the terminal device 210. Again, no special tools may be required. The protection assembly 100 may be re-usable.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A protection assembly for a terminal device of a conductor assembly, the terminal device having an open face and a closed face, the protection assembly comprising:
   a housing configured to at least partially cover the open face; and
   a strap coupled to the housing and configured to extend around the closed face such that the housing is detachably secured to the terminal device,
   wherein the housing includes a base and at least first and second sides, the strap extending from the first side and being configured to detachably couple to the second side,
   wherein the closed face of the terminal device defines a hole for receiving a bolt, and wherein the strap is configured to cover the hole on a surface of the closed face that is opposite to the open face when the housing is detachably coupled to the terminal device.

2. The protection assembly of claim 1, wherein the strap includes a cup configured to cover the hole when the housing is detachably coupled to the terminal device.

3. The protection assembly of claim 1, further comprising an aligning structure coupled to the base and configured to receive the bolt when the housing is detachably coupled to the terminal device.

4. The protection assembly of claim 3, wherein the aligning device is cone-shaped with a hole that receives the bolt.

5. The protection assembly of claim 1, wherein the housing includes a tab extending from the second side, and wherein the strap defines a slot for receiving the tab such that the housing is secured to the terminal device.

6. The protection assembly of claim 1, wherein the first and second sides define a perimeter groove configured to at least partially receive the terminal device.

7. The protection assembly of claim 1, wherein the housing and strap are integral.

8. The protection assembly of claim 1, wherein the strap is elastic.

9. The protection assembly of claim 1, wherein the housing is configured to form a water-tight seal with the terminal device.

10. The protection assembly of claim 1, wherein the strap is rubber.

11. A protection assembly for a terminal device of a conductor assembly, the terminal device having an open face, a closed face, and a bolt extending through the closed face, the protection assembly comprising:
    a housing configured to at least partially cover the open face, the housing including a base and at least first and second sides, the housing further including an aligning device configured to receive the bolt of the terminal device; and
    a strap coupled to the housing at the first side and configured to extend around the closed face to the second side of the housing such that the housing is detachably secured to the terminal device, the strap further including a cup configured to cover the bolt on a surface of the closed face that is opposite to the open face when the housing is detachably coupled to the terminal device.

* * * * *